United States Patent
Achamola et al.

(10) Patent No.: US 10,477,459 B2
(45) Date of Patent: Nov. 12, 2019

(54) PUBLIC LAND MOBILE NETWORK SEARCH IN STATIC STATE USING SENSOR INPUTS

(71) Applicant: QUALCOMM Incorporated, San Diego, CA (US)

(72) Inventors: Sravan Kumar Reddy Achamola, Hyderabad (IN); Kiran Koona, Miyapur (IN); Abhishek Agrawal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/157,000

(22) Filed: May 17, 2016

(65) Prior Publication Data
US 2017/0339627 A1 Nov. 23, 2017

(51) Int. Cl.
| | |
|---|---|
| *H04W 48/14* | (2009.01) |
| *H04W 48/16* | (2009.01) |
| *H04W 4/02* | (2018.01) |
| *H04W 52/02* | (2009.01) |
| *H04W 84/04* | (2009.01) |

(52) U.S. Cl.
CPC .......... *H04W 48/14* (2013.01); *H04W 4/027* (2013.01); *H04W 48/16* (2013.01); *H04W 52/0216* (2013.01); *H04W 84/042* (2013.01); *Y02D 70/10* (2018.01); *Y02D 70/1242* (2018.01); *Y02D 70/1262* (2018.01); *Y02D 70/1264* (2018.01); *Y02D 70/142* (2018.01);
(Continued)

(58) Field of Classification Search
None
See application file for complete search history.

(56) References Cited

U.S. PATENT DOCUMENTS

| | | | |
|---|---|---|---|
| 8,195,234 B2 | 6/2012 | Chang et al. | |
| 8,554,163 B2 | 10/2013 | Deshpande et al. | |

(Continued)

FOREIGN PATENT DOCUMENTS

| | | |
|---|---|---|
| EP | 3133872 A1 | 2/2017 |
| WO | WO-2014160007 A1 | 10/2014 |
| WO | WO-2015157926 A1 | 10/2015 |

OTHER PUBLICATIONS

ISA/EP, International Search Report and Written Opinion of the International Searching Authority, Int'l Application No. PCT/US2017/031192, dated Jun. 23, 2017, European Patent Office, Rijswijk, NL, 17 pgs.

*Primary Examiner* — Mansour Oveissi
(74) *Attorney, Agent, or Firm* — Holland & Hart LLP

(57) ABSTRACT

Methods, systems, and devices for wireless communication are described. A user equipment (UE) may be configured for determining that the UE is to perform a public land mobile network (PLMN) scan operation, the PLMN scan operation to be performed during a PLMN scan window. The UE may track a static state time representing an amount of time that the UE has remained within a static state. The UE may then adjust the PLMN scan window of the UE based at least in part on a value of the static state time satisfying a static state time threshold. The UE may, in various examples, increase the static state time threshold upon adjustment of the PLMN scan window and reset a timer associated with tracking the static state time, or the static state time upon adjustment of the PLMN scan window.

30 Claims, 12 Drawing Sheets

(52) U.S. Cl.
CPC .......... *Y02D 70/146* (2018.01); *Y02D 70/164* (2018.01); *Y02D 70/21* (2018.01)

(56) References Cited

U.S. PATENT DOCUMENTS

| | | |
|---|---|---|
| 8,892,097 B2 | 11/2014 | Manna et al. |
| 8,903,382 B2 | 12/2014 | Swaminathan et al. |
| 9,294,974 B2 | 3/2016 | Kodali et al. |
| 2008/0148398 A1* | 6/2008 | Mezack .................. G06F 21/55 726/22 |
| 2008/0152104 A1* | 6/2008 | Keeler .................. H04W 24/04 379/112.01 |
| 2009/0164813 A1* | 6/2009 | Tu ........................ H04B 1/1615 713/320 |
| 2010/0279637 A1 | 11/2010 | Umatt |
| 2014/0194086 A1* | 7/2014 | Alam ................ H04W 52/0254 455/405 |
| 2014/0269363 A1* | 9/2014 | Lee ..................... H04W 64/006 370/252 |
| 2015/0263877 A1* | 9/2015 | Chang ................ H04W 56/003 370/350 |
| 2017/0078896 A1* | 3/2017 | Kephart, Jr. ........ H04L 41/0823 |
| 2017/0134993 A1* | 5/2017 | Wang ................ H04W 36/0022 |
| 2017/0143218 A1* | 5/2017 | Pande ................ A61B 5/02427 |

\* cited by examiner

PUBLIC LAND MOBILE NETWORK SEARCH IN STATIC STATE USING SENSOR INPUTS

BACKGROUND

The following relates generally to wireless communication, and more specifically to public land mobile network searches in static state using sensor inputs.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

A UE may engage in an automatic search mode if the UE has no registered public land mobile network (PLMN) that is readily available in its particular location. During this automatic search, the UE may scan continuously for available PLMNs that are associated with that UE's PLMN priority list. This scanning process may occur during a PLMN scan window that includes an active scan time interval and a sleep time interval. If there is no registered PLMN that is found in the first scan, the process repeats itself for another PLMN scan window interval. Under normal operations, this process will repeat itself until a registered PLMN is found, even if the UE remains in the same location. As the number of PLMNs available to be used by a UE may not generally change while the UE is in a same location (meaning that the UE is in a static state), repeated and continuous searching for PLMNs may not be an efficient use of the UE power and other resources.

SUMMARY

When a user equipment (UE) remains in a static state for a period of time, there may be a reduced need to search for available public land mobile networks (PLMNs) at regular intervals under normal operations. Because the UE has remained in a static state for a period of time, meaning that the UE has not moved from a general location during the period of time, it is likely that the list of available PLMNs at the UE's particular location will remain the same. Therefore, a UE that is deemed to be in a static state and that is searching for an available PLMN may reduce the frequency of active PLMN searches so as to conserve power. Sensors may be used to determine if the UE is in a static state. For example, an accelerometer (or other motion related sensors) embedded in or attached to the UE may be used to determine if the UE is in a static state or if the UE is in motion (e.g., a user with the UE is walking, driving, etc.). If the UE is determined to be in a static state for a period of time, the UE may alter a sleep interval associated with the PLMN scan window so as to reduce the frequency of PLMN scanning by the UE. Thus, the UE may conserve power and other resources while the UE is in a static state.

A method of wireless communication is described. The method may include determining that a UE is to perform a PLMN scan operation, the PLMN scan operation to be performed during a PLMN scan window, tracking a static state time representing an amount of time that the UE has remained within a static state and adjusting the PLMN scan window of the UE based at least in part on a value of the static state time satisfying a static state time threshold.

An apparatus for wireless communication is described. The apparatus may include means for determining that a UE is to perform a PLMN scan operation, the PLMN scan operation to be performed during a PLMN scan window, means for tracking a static state time representing an amount of time that the UE has remained within a static state and means for adjusting the PLMN scan window of the UE based at least in part on a value of the static state time satisfying a static state time threshold.

A further apparatus is described. The apparatus may include a processor, memory in electronic communication with the processor, and one or more instructions stored in the memory. The one or more instructions may be operable to cause the apparatus to determine that a UE is to perform a PLMN scan operation, the PLMN scan operation to be performed during a PLMN scan window, track a static state time representing an amount of time that the UE has remained within a static state and adjust the PLMN scan window of the UE based at least in part on a value of the static state time satisfying a static state time threshold.

A non-transitory computer readable medium for wireless communication is described. The non-transitory computer-readable medium may include one or more instructions to cause a processor to determine that a UE is to perform a PLMN scan operation, the PLMN scan operation to be performed during a PLMN scan window, track a static state time representing an amount of time that the UE has remained within a static state and adjust the PLMN scan window of the UE based on a value of the static state time satisfying a static state time threshold.

In some examples of the method, apparatus, or non-transitory computer-readable medium described above, adjusting the PLMN scan window includes extending a sleep interval of the PLMN scan window.

Some examples of the method, apparatus, or non-transitory computer-readable medium described above may further include processes, features, means, or one or more instructions for adjusting (e.g., increasing) the static state time threshold upon adjustment of the PLMN scan window. Some examples of the method, apparatus, or non-transitory computer-readable medium described above may further include processes, features, means, or one or more instructions for resetting a timer associated with tracking the static state time, or the static state time upon adjustment of the PLMN scan window.

Some examples of the method, apparatus, or non-transitory computer-readable medium described above may further include processes, features, means, or one or more instructions for again tracking the static state time. Some examples of the method, apparatus, or non-transitory computer-readable medium described above may further include processes, features, means, or one or more instructions for adjusting the PLMN scan window of the UE based on the value of the static state time satisfying the increased static state time threshold.

In some examples of the method, apparatus, or non-transitory computer-readable medium described above, adjusting the PLMN scan window includes adjusting a parameter associated with the PLMN scan window by a predetermined amount. Some examples of the method, apparatus, or non-transitory computer-readable medium described above may further include processes, features, means, or one or more instructions for adjusting the predetermined amount based on a value of the static state time threshold.

Some examples of the method, apparatus, or non-transitory computer-readable medium described above may further include processes, features, means, or one or more instructions for determining that the UE is in a low battery state. Some examples of the method, apparatus, or non-transitory computer-readable medium described above may further include processes, features, means, or one or more instructions for adjusting the predetermined amount based on the determination that the UE is in the low battery state.

Some examples of the method, apparatus, or non-transitory computer-readable medium described above may further include processes, features, means, or one or more instructions for determining that the UE has exited the static state. Some examples of the method, apparatus, or non-transitory computer-readable medium described above may further include processes, features, means, or one or more instructions for resetting at least one of a timer associated with tracking the static state time, the static state time threshold, or the PLMN scan window.

In some examples of the method, apparatus, or non-transitory computer-readable medium described above, adjusting the PLMN scan window includes decreasing an active scan time interval of the PLMN scan window. Some examples of the method, apparatus, or non-transitory computer-readable medium described above may further include processes, features, means, or one or more instructions for identifying, via a motion-detecting sensor, that the UE has remained within the static state.

In some examples of the method, apparatus, or non-transitory computer-readable medium described above, the motion-detecting sensor includes at least one of an accelerometer, a gyroscope, a global positioning sensor (GPS), a gravity sensor, a rotational vector sensor, a positional orientation sensor, a magnetometer, a UE compass, or a pedometer.

DETAILED DESCRIPTION

A user equipment (UE) may be able to receive service from one or more public land mobile networks (PLMNs). In some examples, one of the PLMNs may be a home PLMN (HPLMN) which may identify the PLMN in which a wireless service subscriber's profile is held. Users roaming to other networks may receive subscription information from the HPLMN. Upon power up, and in other instances, a UE may search for a PLMN from which the UE may receive service. If a PLMN is found, then the UE may register with the PLMN. The UE may then actively communicate via the PLMN or go into an idle mode if communication is not required. If the UE subsequently loses connection with the PLMN, the UE may enter an out-of-service (OOS) state and attempt to acquire a PLMN from which service may be obtained.

The UE consumes battery power as the UE continuously searches for PLMNs while in the OOS state. Power consumption while the UE is in the OOS state may significantly reduce both standby time and talk time, especially if the OOS duration is long. To remedy this, and in certain circumstances, the UE may search for PLMNs less frequently in order to conserve battery power. In certain aspects, the UE may spend a reduced amount of time scanning for PLMNs when the UE determines that the UE has not moved from a general location for a period of time, meaning that the UE is in a static state. Thus, when the UE is in a static state for a period of time, the UE may conserve power by reducing the amount of time used in futile PLMN scans.

Aspects of the disclosure are initially described in the context of a wireless communication system. Specific examples are described for tracking the amount of time a UE has been in a static state, and then updating (e.g., adjusting) a PLMN scan window if the UE has been in a static state for an amount of time that satisfies a threshold. Aspects of the disclosure are further illustrated by and described with reference to apparatus diagrams, system diagrams, and flowcharts that relate to public land mobile network search in static state using sensor inputs.

Figure 1:
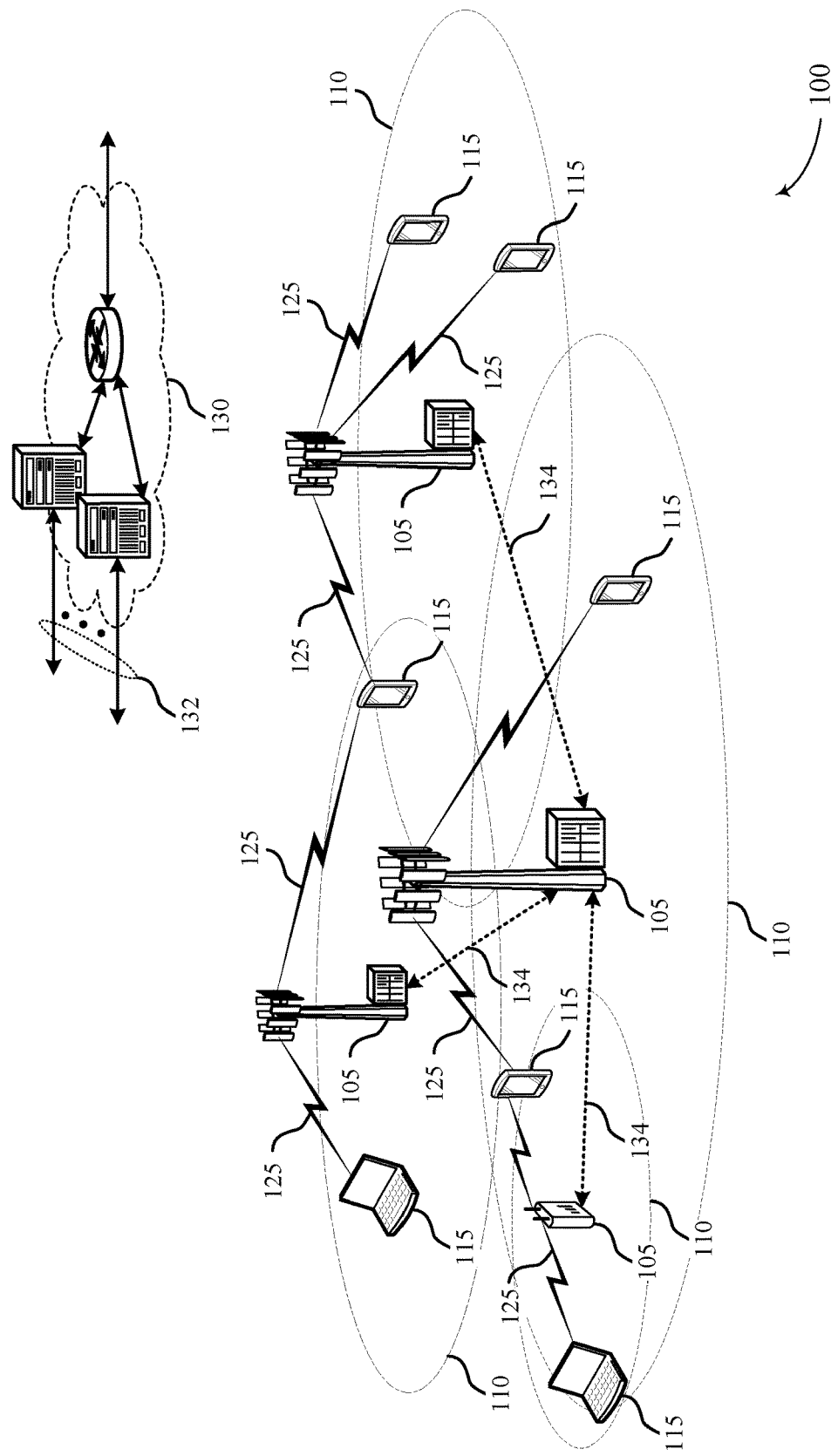
FIG. 1 illustrates an example of a wireless communications system that supports public land mobile network (PLMN) search in static state using sensor inputs in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. In some examples, the wireless communications system 100 may include UEs 115 that scan for PLMNs during a scan window. In certain examples, a UE 115 may track a static state time wherein the UE 115 does not move or does not change location. If this static state time exceeds a predetermined threshold, the UE 115 may adjust the PLMN scan window so as to result in a reduced amount of time spent in actively scanning for PLMNs.

Base stations 105 may wirelessly communicate with UEs 115 (e.g., using various RATs or wireless technologies) via one or more base station antennas. Each base station 105 may provide communication coverage for a respective geographic coverage area 110. Each base station 105 may provide communication coverage for a macro cell, a small cell, or other types of cell. The term "cell" is a 3rd Generation Partnership Project "3GPP" term that can be used to describe a base station, a carrier or component carrier associated with a base station, or a coverage area (e.g., sector, etc.) of a carrier or base station, depending on context. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, wireless communication UE apparatus, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. A base station 105 may also be referred to as an access point ("AP"), a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RB S"), or some other terminology.

The UEs 115 may search for PLMNs upon power up or in other circumstances. If a PLMN is found, then the UE 115 may operate in either a connected mode and actively communicate with the PLMN to obtain service, or the UE may operate in an idle mode and camp on the PLMN if communication is not required. The UE 115 may fail to acquire a PLMN at power up (e.g., if it is in an area with no service) or may lose an acquired PLMN while in the idle or connected mode (e.g., due to user mobility or radio link failure). The UE 115 may then enter an out-of-service (OOS) state and search for PLMNs suitable for camping on or obtaining service.

In an aspect, the UE 115 may perform a scan to detect for PLMNs while in the OOS state. The scan may occur within a PLMN scan window which may be repeated until the UE 115 identifies a PLMN with which the UE 115 may connect. During each PLMN scan window, the UE 115 may sleep for much of the time and may wake up periodically to search for PLMNs. For example, a PLMN scan window may include an active scan time interval and a sleep time interval. Thus, the UE 115 may power down as much circuitry as possible during the sleep time interval in order to conserve battery power and other resources and then may only search for PLMNs during the active scan time interval. Under normal operation, the PLMN scan window duration is uniform in that the sleep time interval and/or the active scan time interval may be fixed during the repeated instances of the PLMN scan window as the UE 115 searches for an available PLMN. However, as described herein, the duration of the scan window may be changed if a UE 115 remains in a static state for a period of time, meaning that the UE 115 does not move from a general location during the period of time. The duration may change so as to reduce the amount of time that the UE 115 spends in actively searching for PLMNs, as the list of available PLMNs would not be expected to change very often while the UE remains in a static state.

Figure 2:
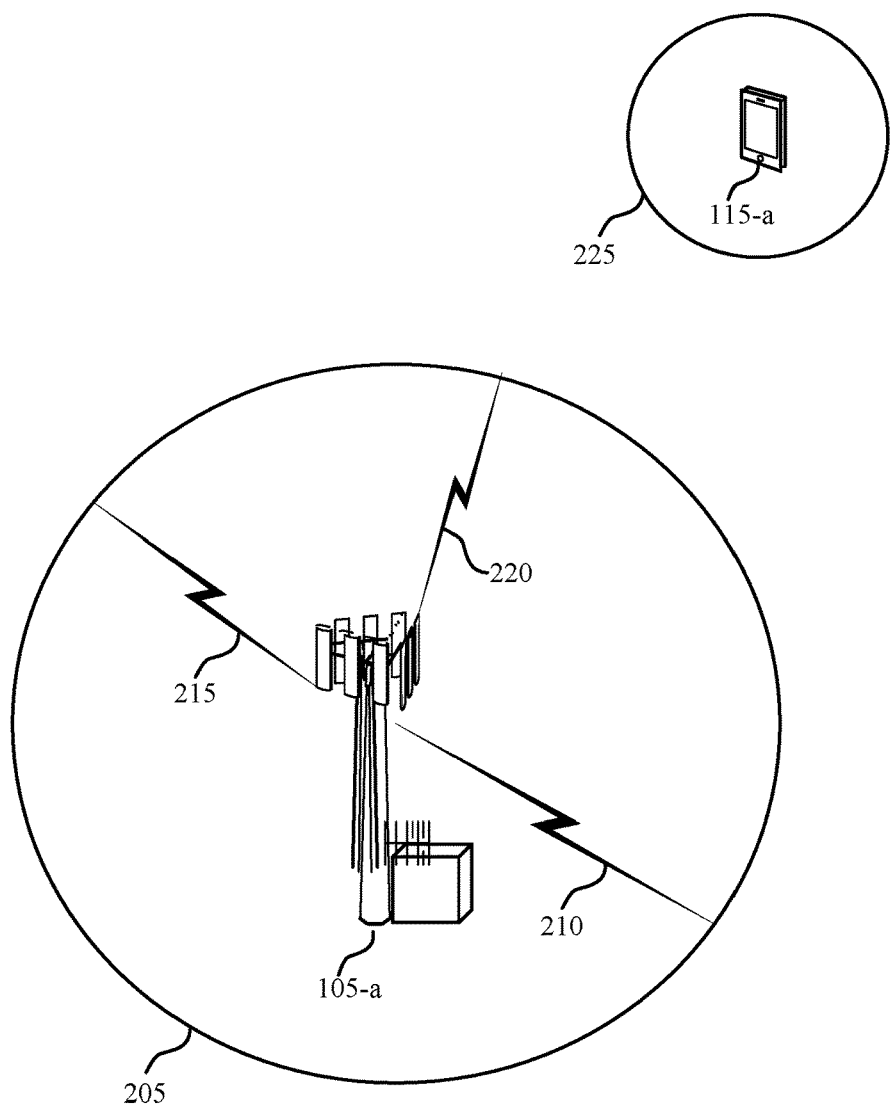
FIG. 2 illustrates an example of a wireless communications system that supports PLMN search in static state using sensor inputs in accordance with aspects of the present disclosure.

FIG. 2 illustrates an example of a wireless communications system 200 for PLMN searches in static state using sensor inputs, in accordance with aspects of the present disclosure. Wireless communications system 200 may include base station 105-a and UE 115-a, which may be examples of the corresponding devices described with reference to FIG. 1.

Wireless communications system 200 depicts base station 105-a transmitting signal transmissions 210, 215, and 220. Signal transmissions 210, 215, and 220 may be transmitted a certain distance, which is represented by geographic coverage area 205, which may be an example of geographic coverage area 110 described with reference to FIG. 1. Although signal transmission 210, 215, and 220 are transmitted from the same base station 105-a, each of signal transmissions 210, 215, and 220 may be transmitted different distances due to factors such as line-of-sight obstructions, environmental conditions, etc.

Wireless communications system 200 also depicts UE 115-a outside of geographic coverage area 205. Because UE 115-a is outside of geographic coverage area 205, UE 115-a may be in an OOS state. Under this scenario, if UE 115-a is operational, the UE 115-a may search for PLMNs suitable for camping on or for obtaining service. UE 115-a may also be in a static state, meaning that UE 115-a is not moving from beyond a movement threshold 225 during a period of time. Thus, the number of PLMNs that the UE 115-a may discover during its searching may not significantly change during the course of repeated PLMN scans. Utilizing conventional OOS state scanning techniques, UE 115-a may continuously scan (e.g., in vain) for a PLMN for an indeterminate amount of time which would result in a waste of resources. However, as explained herein, UE 115-a may reduce the amount of time spent in actively scanning for PLMNs, which is futile, because the UE 115-a is in a static state.

Figure 3A:
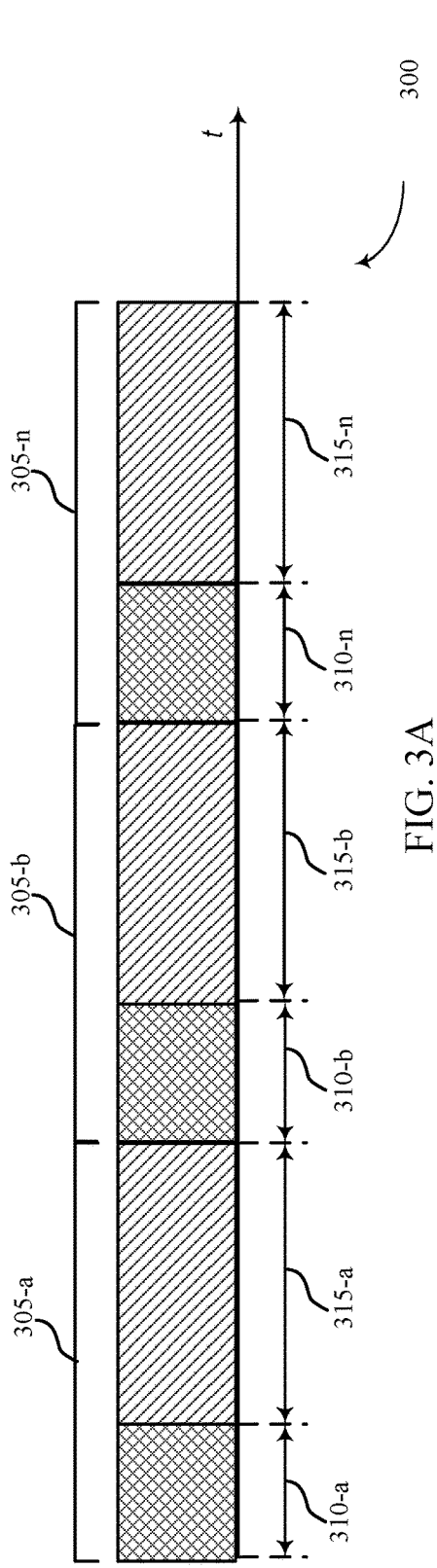
FIGS. 3A, 3B, and 3C illustrate an example of timing diagrams that support PLMN search in static state using sensor inputs in accordance with aspects of the present disclosure.

FIG. 3A illustrates an example of a timing diagram 300 for PLMN search in static state using sensor inputs, in accordance with aspects of the present disclosure. In some cases, timing diagram 300 may represent aspects of techniques performed by a UE 115 as described with reference to FIGS. 1 and 2.

Timing diagram 300 illustrates a conventional PLMN search performed by a UE 115 in an OOS state over a time period t. Time period t comprises a number of PLMN scan windows 305-a, 305-b, and 305-n. Each of the PLMN scan windows 305-a, 305-b, and 305-n may be comprised of active scan time intervals 310-a, 310-b, and 310-n, and sleep time intervals 315-a, 315-b, and 315-n, respectively. During a conventional PLMN search, each of the active scan time intervals 310-a, 310-b, and 310-n may be fixed in duration and equal to each other. Similarly, sleep time intervals 315-a, 315-b, and 315-n may be fixed in duration and equal to each other. The PLMN scan windows 305-a, 305-b, and 305-n may repeat indefinitely until the UE 115 runs out of power or finds a PLMN to initiate a wireless connection with.

Figure 3B:
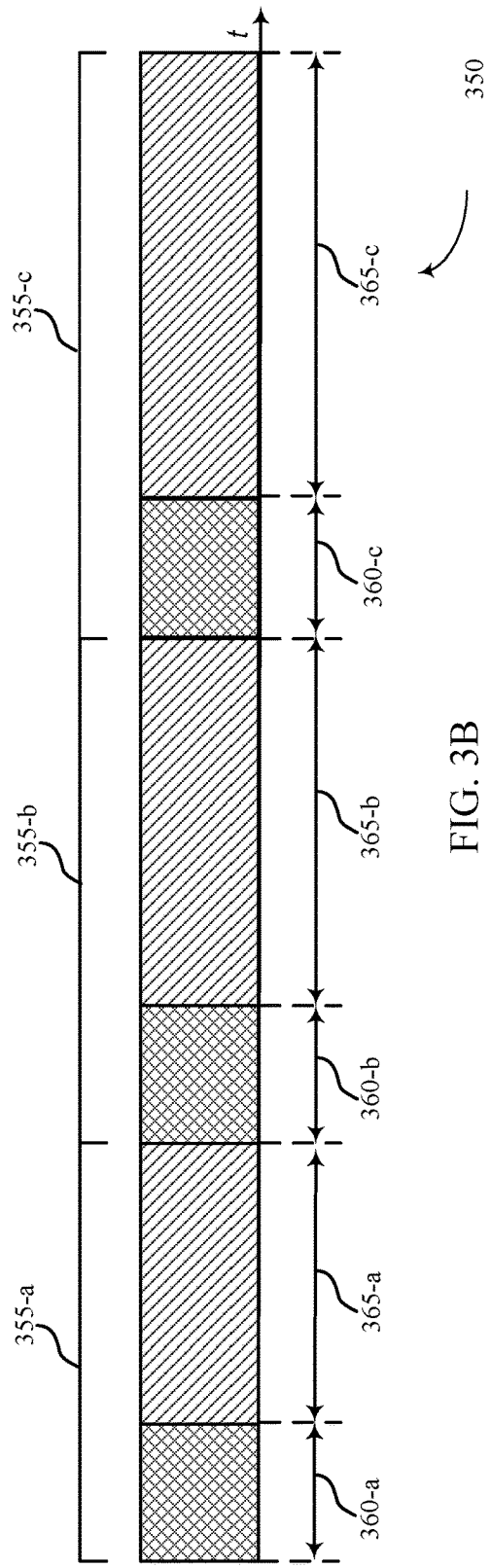

FIG. 3B illustrates an example of a timing diagram 350 for PLMN search in static state using sensor inputs, in accordance with aspects of the present disclosure. In some cases, timing diagram 350 may represent aspects of techniques performed by a UE 115 as described with reference to FIGS. 1 and 2.

Timing diagram 350 illustrates a modified PLMN search performed by a UE 115 in an OOS state over a time period t while UE 115 is in a static state. As illustrated in the timing diagram 300 of FIG. 3A, time period t in timing diagram 350 comprises a number of PLMN scan windows 355-a, 355-b, and 355-c. Each of the PLMN scan windows 355-a, 355-b, and 355-c may be comprised of active scan time intervals 360-a, 360-b, and 360-c, and sleep time intervals 365-a, 365-b, and 365-c, respectively. PLMN scan window 355-a comprises an active scan time interval and a sleep time interval similar to the conventional active scan time intervals 310 and sleep time intervals 315 described in FIG. 3A.

In some instances, a UE 115 may track the amount of time that the UE 115 remains in a static state. The UE 115 may track the static state time with a timer. If the amount of time that the UE 115 remains in a static state satisfies a predetermined static state time threshold, then the UE 115 may adjust the PLMN scan window 355, as illustrated in the PLMN scan windows 355-b and 355-c. For example, in a situation where the UE 115 is in a static state for a time period that satisfies a static state time threshold, the UE 115 may adjust PLMN scan window 355-b such that the active scan time interval 360-b is the same duration as active scan time interval 360-a, but such that sleep time interval 365-b is extended relative to sleep time interval 365-a. Sleep time interval 365-b may be extended by any period of time including whole multiples of the duration of sleep time interval 365-a.

The static time threshold may be adjusted. For example, the UE 115 may determine that the UE 115 has been in a static state for a period of time that is equal to or exceeds the static time threshold. Upon this determination, the UE 115 may update (e.g., reset) the tracked amount of static state time or the timer associated with the static state time (e.g., to zero) and then may again begin to track the amount of static state time. The UE 115 may also adjust the static state time threshold to a value based in part on the previous value of the static state time threshold and the adjusted PLMN scan window 355-b. In some cases, the new value of the static state time threshold may be a sum of the previous value of the static state time threshold and the adjusted PLMN scan window 355-b.

PLMN scan window 355-c may illustrate an example of a subsequent time period where the static state time tracked by the UE 115 satisfies an adjusted static state time threshold (e.g., such as a static state time threshold that has been increased based on the UE 115 having already been in a static state for a smaller static state time threshold). In this case the UE 115 may adjust PLMN scan window 355-c further. The newly adjusted PLMN scan window 355-c may comprise an active scan time interval that is equal in duration to that of time intervals 360-a and 360-b, and a sleep time interval that is longer in duration than sleep time interval 365-b. Sleep time interval 365-c may be extended by any period of time including whole multiples of the previous sleep time intervals 365-a and 365-b.

As described above, once the adjusted static state time threshold is satisfied, the UE 115 may update (e.g., reset) the tracked amount of static state time or a timer associated with the static state time (e.g., to zero) and then begin anew to track static state time. The UE 115 may also adjust the current static state time threshold based on the previous value of the adjusted static state time threshold and the newly adjusted PLMN scan window 355-c. In an example, UE 115 may adjust the current static state time threshold to be a sum of the previous value of the adjusted static state time threshold and the newly adjusted PLMN scan window 355-c.

Each time the newly adjusted static state time threshold is satisfied the UE 115 may further adjust the PLMN scan window and the static state time threshold. The technique may be expressed as follows. First, a determination is made whether the static state time is greater than or equal to the static state time threshold. In the event that the static state time is indeed greater than or equal to the static state time threshold, several actions follow. First, the PLMN scan window is updated (e.g., adjusted) such that the PLMN scan window equals the sum of the current PLMN scan window and a predetermined extended period of time. Second, the static state time threshold is updated (e.g., adjusted) such that the static state time threshold equals the sum of the current static state time threshold and the adjusted PLMN scan window. Lastly, the static state time threshold is set equal to the adjusted static state time threshold and the static state time is set to zero.

Figure 3C:
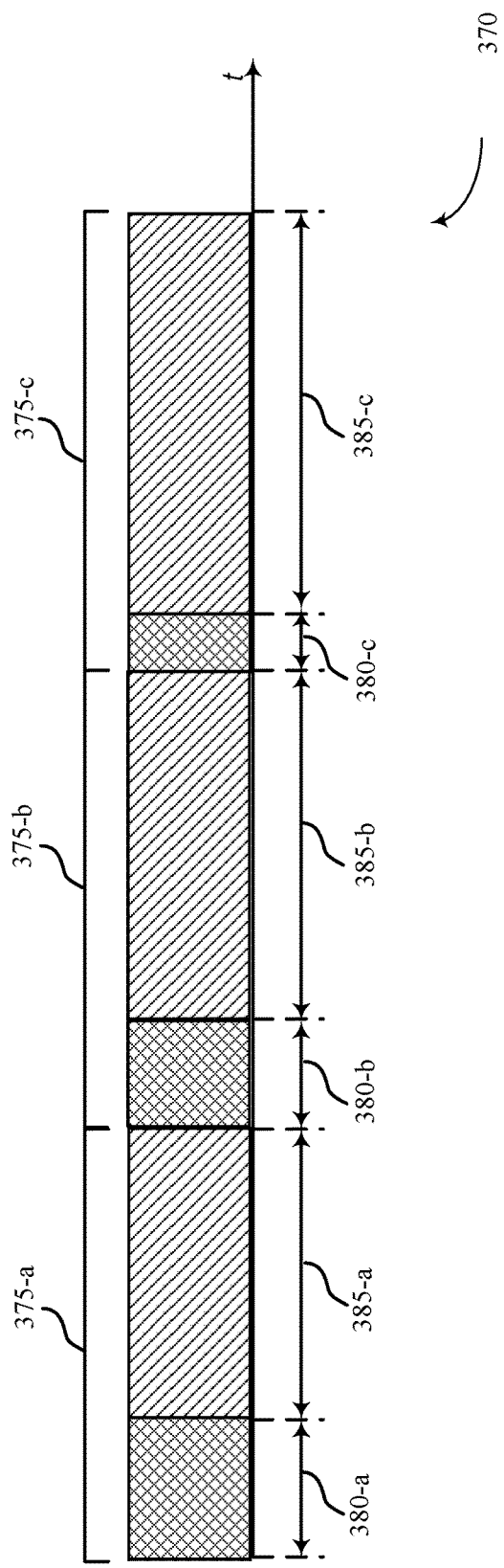

FIG. 3C illustrates an example of a timing diagram 370 for PLMN search in static state using sensor inputs, in accordance with aspects of the present disclosure. In some cases, timing diagram 370 may represent aspects of techniques performed by a UE 115 as described with reference to FIGS. 1 and 2.

Timing diagram 370 illustrates a modified PLMN search performed by a UE 115 in an OOS state over a time period t. Time period t is comprised of PLMN scan windows 375-a, 375-b, and 375-c. Each of the PLMN scan windows 375-a, 375-b, and 375-c may be comprised of active scan time intervals 380-a, 380-b, and 380-c, and sleep time intervals 385-a, 385-b, and 385-c, respectively. PLMN scan window 375-a comprises an active scan time interval and a sleep time interval similar to the conventional active scan time intervals 310 and sleep time intervals 315 described in FIG. 3A.

As described above with respect to FIG. 3B, a UE 115 may track the amount of time that the UE 115 has remained in a static state. The UE 115 may track the static state time with a timer. If the amount of time that the UE 115 has stayed in a static state has satisfied a predetermined static state time threshold, then the UE 115 may adjust the PLMN scan window 375, as is illustrated in PLMN scan windows 375-b and 375-c. For example, in a situation where the UE 115 is in a static state for a time period that satisfies a static state time threshold, the UE 115 may adjust PLMN scan window 375-b such that the active scan time interval 380-b is shortened relative to active scan time interval 380-a. Sleep time interval 385-b may be correspondingly extended relative to sleep time interval 385-a or sleep time interval 385-b may remain the same time duration as sleep time interval 385-a (if sleep time interval 385-b remains the same time duration as sleep time interval 385-a, PLMN scan window 375-b will correspondingly be shortened).

PLMN scan window 375-c may illustrate an example of a time period subsequent to PLMN scan window 375-b where the UE 115 tracks an amount of time that the UE 115 has remained in a static state that satisfies the static state time threshold. In this example, the UE 115 may adjust PLMN scan window 375-c such that active scan time interval 380-c is further shortened relative to active scan time interval 385-c. Sleep time interval 385-c may be correspondingly extended relative to sleep time interval 385-b or sleep time interval 385-c may remain the same time duration as sleep time interval 385-a (if sleep time interval 385-c remains the same time duration as sleep time interval

385-*a*, PLMN scan window 375-*c* will correspondingly be shortened). As described above with respect to FIG. 3B, the static state time thresholds used to trigger the adjustment of the PLMN scan windows 375 may also be adjusted.

Additionally, the examples illustrated in FIGS. 3B and 3C may be affected by a determination that the UE is in a low battery state. For example, active scan time intervals or sleep time intervals may be shortened or lengthened in greater amounts, respectively, if the UE is in a low battery state.

Figure 4:
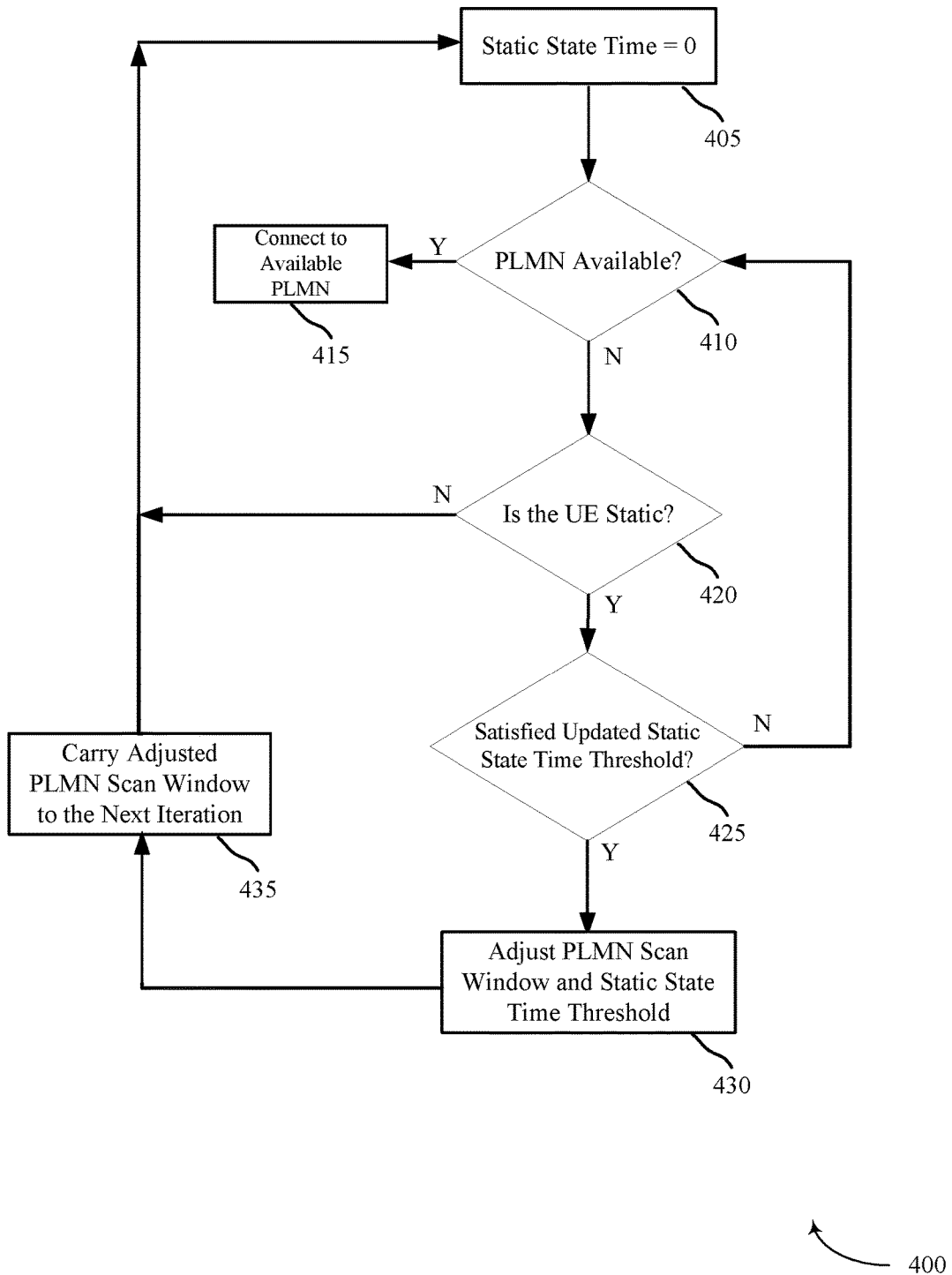
FIG. 4 illustrates an example of a process flow in a system that supports PLMN search in static state using sensor inputs in accordance with aspects of the present disclosure.

FIG. 4 illustrates an example of a process flow 400 for PLMN search in static state using sensor inputs in accordance with various aspects of the present disclosure. Process flow 400 may be implemented using a UE 115, which may be an example of the corresponding devices described with reference to FIGS. 1 and 2.

In block 405 a UE 115 may set a static state time to zero, for example. Block 405 may involve initializing or reinitializing a timer. In decision block 410, the UE 115 may determine if there is a PLMN available for the UE 115 to connect to utilizing PLMN scan windows described with respect to FIG. 3A, 3B, or 3C. If there is, the UE 115 may connect with the PLMN in block 415. The UE 115 may also reset the static state time (e.g., to zero) in step 415. If there is not a PLMN available for the UE 115 to connect to, process flow 400 continues to decision block 420.

In decision block 420, the UE 115 determines if the UE 115 is in a static state. This static state determination may be performed by a motion-detecting sensor. The motion-detecting sensor may be one or more of the following: an accelerometer, a gyroscope, a global positioning sensor (GPS), a gravity sensor, a rotational vector sensor, a positional orientation sensor, a magnetometer, a UE compass, or a pedometer, for example. If the UE 115 has determined that the UE 115 is no longer in a static state (e.g., the UE 115 has moved a non-negligible amount or has substantially changed location), process flow 400 proceeds back to step 405 where the static state time is set to zero. If the UE 115 has remained in a static state, process flow 400 advances to decision block 425.

In decision block 425 the UE 115 may determine if the static state time of the UE 115 has satisfied (e.g., met or exceeded) a predetermined static state time threshold (in subsequent iterations, the static state time threshold may be an updated static state time threshold). If the UE 115 has not satisfied the static state time threshold, process flow 400 goes back to decision block 410. If the UE 115 has satisfied the static state time threshold, process flow 400 advances to block 430. In block 430 the UE 115 updates (e.g., adjusts) the PLMN scan window and the static state time threshold utilizing techniques described with respect to FIG. 3B or 3C. After updating the PLMN scan window and the static state time threshold, process flow continues to block 435 where the UE 115 carries the adjusted PLMN scan window to the next iteration of process flow 400. Block 435 may involve subsequent iterations of process flow 400 where no PLMNs are available and the PLMN scan window is adjusted in greater amounts after each iteration utilizing techniques described with respect to FIG. 3B or 3C. After block 435 is performed, process flow 400 reverts back to step 405 and sets the static state time or a timer associated with the static state time back (e.g., to zero). It should be noted that in subsequent iterations of process flow 400, the adjusted values of the PLMN scan window and the static state time threshold are utilized with techniques described with respect to FIG. 3B or 3C.

Figure 5:
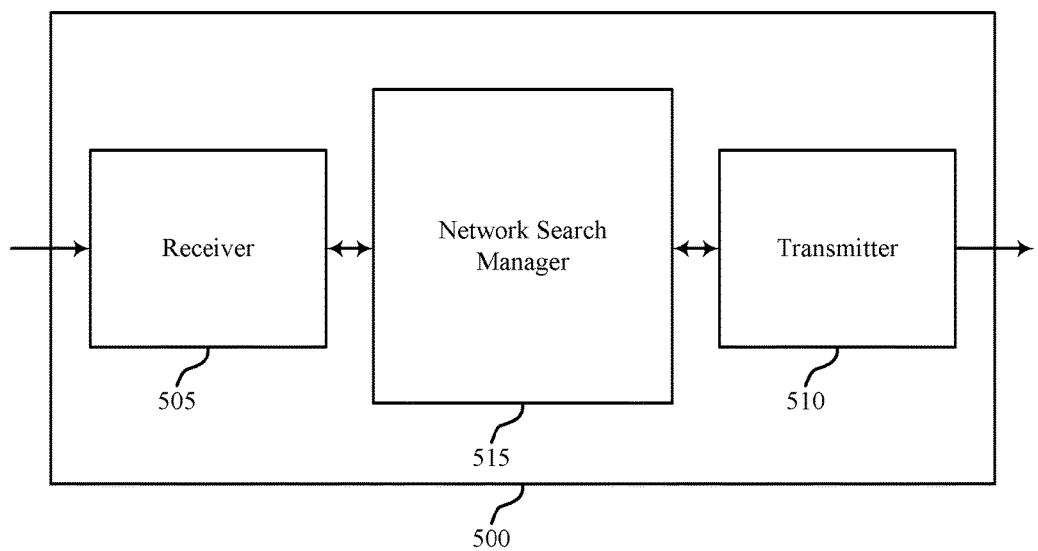
FIGS. 5 through 7 show block diagrams of a wireless device that supports PLMN search in static state using sensor inputs in accordance with aspects of the present disclosure.

FIG. 5 shows a block diagram of a wireless device 500 that supports PLMN search in static state using sensor inputs in accordance with various aspects of the present disclosure. Wireless device 500 may be an example of aspects of a UE 115 described with reference to FIGS. 1, 2, and 4. Wireless device 500 may include receiver 505, transmitter 510 and network search manager 515. Wireless device 500 may also include a processor. Each of these components may be in communication with each other.

The receiver 505 may receive information such as packets, user data, or control information associated with various information channels (e.g., control channels, data channels, and information related to public land mobile network search in static state using sensor inputs, etc.). Information may be passed on to other components of the device. The receiver 505 may be an example of aspects of the transceiver 825 described with reference to FIG. 8.

The transmitter 510 may transmit signals received from other components of wireless device 500. In some examples, the transmitter 510 may be collocated with a receiver in a transceiver module. For example, the transmitter 510 may be an example of aspects of the transceiver 825 described with reference to FIG. 8. The transmitter 510 may include a single antenna, or it may include a plurality of antennas.

Figure 6:
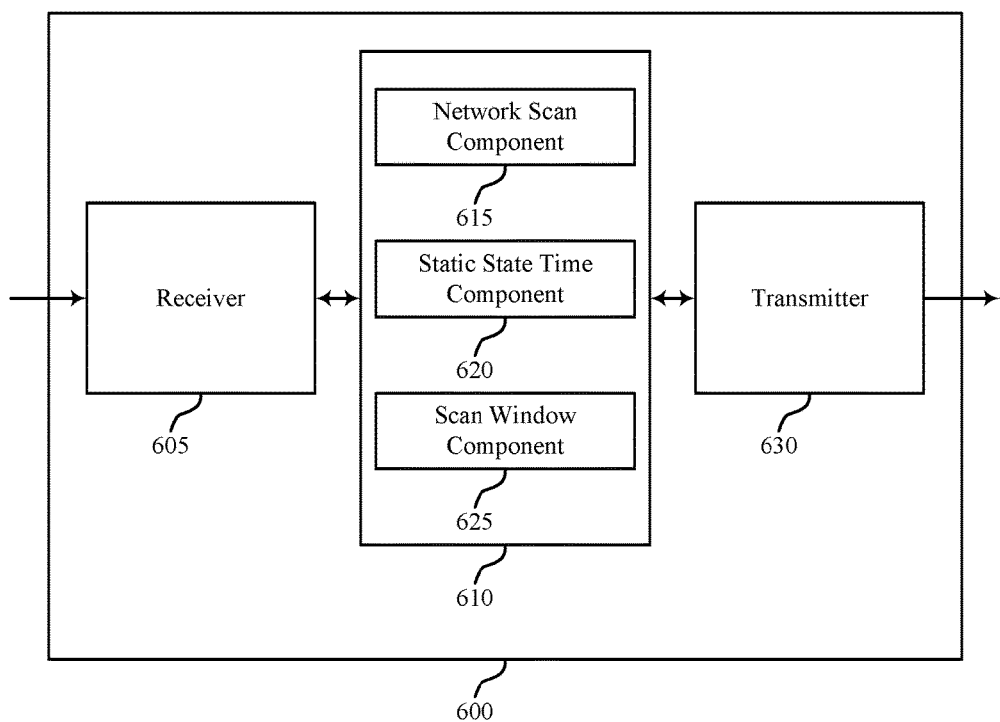

The network search manager 515 may determine to perform a PLMN scan operation, the PLMN scan operation to be performed during a PLMN scan window, track a static state time representing an amount of time that the wireless device 500 has remained within a static state, and adjust the PLMN scan window of the wireless device 500 based on a value of the static state time satisfying a static state time threshold, as described in greater detail with respect to FIG. 6. The network search manager 515 may also be an example of aspects of the network search manager 805 described with reference to FIG. 8.

FIG. 6 shows a block diagram of a wireless device 600 that supports PLMN search in static state using sensor inputs in accordance with various aspects of the present disclosure. Wireless device 600 may be an example of aspects of a wireless device 500 or a UE 115 described with reference to FIGS. 1, 2, 4, and 5. Wireless device 600 may include receiver 605, network search manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The network search manager 610 may be an example of aspects of network search manager 515 described with reference to FIG. 5. The network search manager 610 may include network scan component 615, static state timer component 620 and scan window component 625. The network search manager 610 may be an example of aspects of the network search manager 805 described with reference to FIG. 8.

The network scan component 615 may determine that the wireless device 600 is to perform a PLMN scan operation, the PLMN scan operation to be performed during a PLMN scan window. The static state time component 620 may track the static state time during which the wireless device 600 remains in a static state. The static state time component 620 may also reset a timer associated with tracking the static state time, or otherwise reset the tracked static state time upon adjustment of the PLMN scan window.

The scan window component 625 may adjust a variety of different parameters involved in PLMN searches. The scan window component 625 may adjust the PLMN scan window of the wireless device 600 by a predetermined amount based on the value of the static state time satisfying a static state time threshold. The scan window component 625 may adjust the predetermined amount based on the determination that the wireless device 600 is in the low battery state. For example, an active scan time interval or a sleep time interval (of the PLMN scan window) may be shortened or lengthened in greater amounts, respectively, if the UE is in a low battery state. The scan window component 625 may adjust (e.g., increase) the static state time threshold upon adjustment of the PLMN scan window. The scan window component 625 may also reset a timer associated with tracking the static state time, or the static state time.

In some cases, adjusting the PLMN scan window includes: adjusting a parameter associated with the PLMN scan window by a predetermined amount. In some cases, adjusting the PLMN scan window includes: decreasing an active scan time interval of the PLMN scan window. In some cases, adjusting the PLMN scan window includes: extending a sleep interval of the PLMN scan window.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
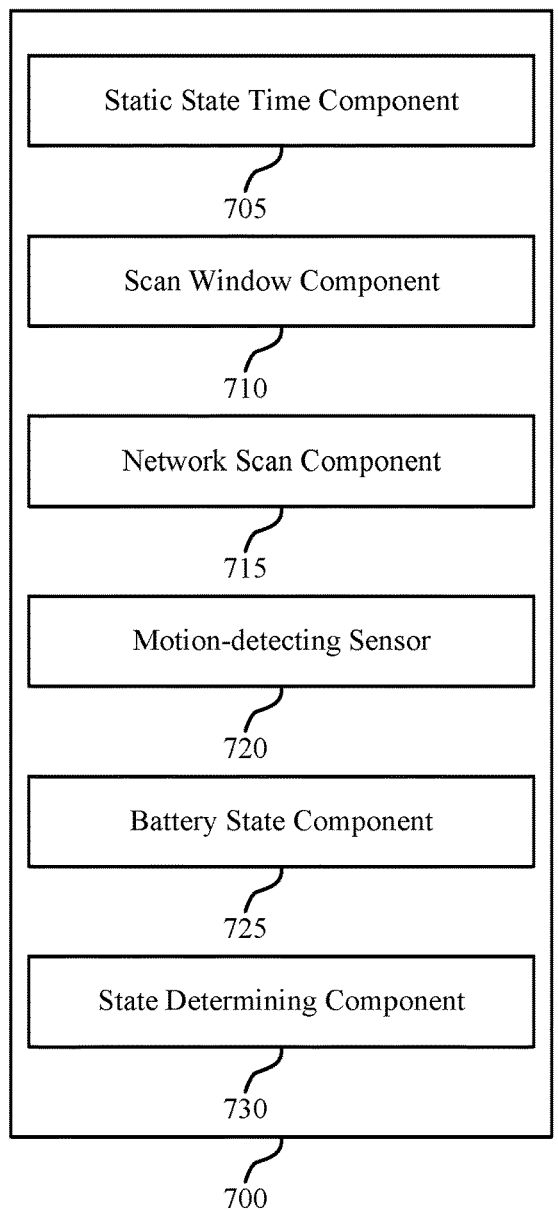

FIG. 7 shows a block diagram of a network search manager 700 which may be an example of the corresponding component of wireless device 500 or wireless device 600. That is, network search manager 700 may be an example of aspects of network search manager 515 or network search manager 610 described with reference to FIGS. 5 and 6. The network search manager 700 may also be an example of aspects of the network search manager 805 described with reference to FIG. 8.

The network search manager 700 may include static state time component 705, scan window component 710, network scan component 715, motion-detecting sensor 720, battery state component 725 and state determining component 730. Each of these modules may communicate, directly or indirectly, with one another (e.g., via one or more buses).

The static state time component 705 may track a static state time representing an amount of time that the wireless device 500 or 600 has remained within a static state. The static state time component 705 may also reset a timer associated with tracking the static state time, or the static state time when the static state time or the timer associated with tracking the static state time satisfies a static state time threshold.

The scan window component 710 may adjust a variety of different parameters involved in PLMN searches. The scan window component 710 may adjust the PLMN scan window of the wireless device 500 or 600 by a predetermined amount based on the value of the static state time satisfying a static state time threshold. The scan window component 710 may adjust the predetermined amount based on the determination that the wireless device 500 or 600 is in the low battery state. The scan window component 710 may adjust (e.g, increase) the static state time threshold upon adjustment of the PLMN scan window. The scan window component 710 may also reset a timer associated with tracking the static state time, or the static state time.

The network scan component 715 may perform a PLMN scan operation, the PLMN scan operation to be performed during a PLMN scan window. The motion-detecting sensor 720 may identify that the wireless device 500 or 600 has remained within a static state. In some cases, the motion-detecting sensor includes at least one of an accelerometer, a gyroscope, a global positioning sensor (GPS), a gravity sensor, a rotational vector sensor, a positional orientation sensor, a magnetometer, a UE compass, or a pedometer.

The battery state component 725 may determine that the wireless device 500 or 600 is in a low battery state. The state determining component 730 may determine that the wireless device 500 or 600 has entered or exited the static state.

Figure 8:
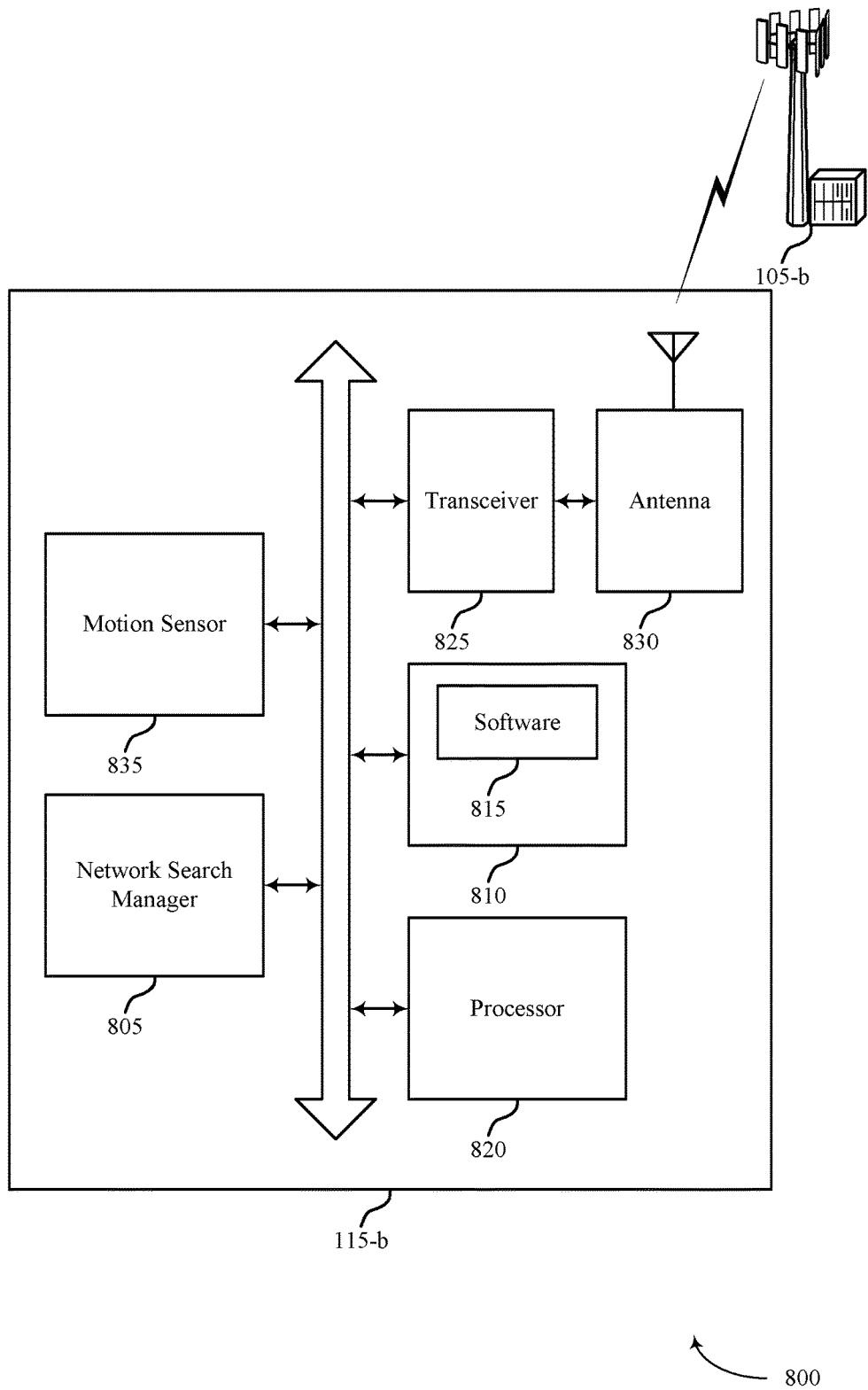
FIG. 8 illustrates a block diagram of a system including a user equipment (UE) that supports PLMN search in static state using sensor inputs in accordance with aspects of the present disclosure.

FIG. 8 shows a diagram of a system 800 including a device that supports PLMN search in static state using sensor inputs in accordance with various aspects of the present disclosure. For example, system 800 may include UE 115-*b*, which may be an example of a wireless device 500, a wireless device 600, or a UE 115 as described with reference to FIGS. 1, 2, 4, and 5 through 7.

UE 115-*b* may also include network search manager 805, memory 810, processor 820, transceiver 825, antenna 830 and motion sensor 835. Each of these modules may communicate, directly or indirectly, with one another (e.g., via one or more buses). The network search manager 805 may be an example of a network search manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., public land mobile network search in static state using sensor inputs, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

Motion sensor 835 may identify that the UE 115-*b* has remained within a static state. In some cases, the motion-detecting sensor includes at least one of an accelerometer, a gyroscope, a global positioning sensor (GPS), a gravity sensor, a rotational vector sensor, a positional orientation sensor, a magnetometer, a UE compass, or a pedometer. Motion sensor 835 may communicate, directly or indirectly, with network search manager 805 by indicating to the network search manager 805 that the UE 115-*b* is no longer in a static state. If the UE 115-*b* is no longer in a static state that may affect the PLMN scan windows that the network search manager 805 may employ to search for appropriate PLMNs for the UE 115-*b*.

Figure 9:
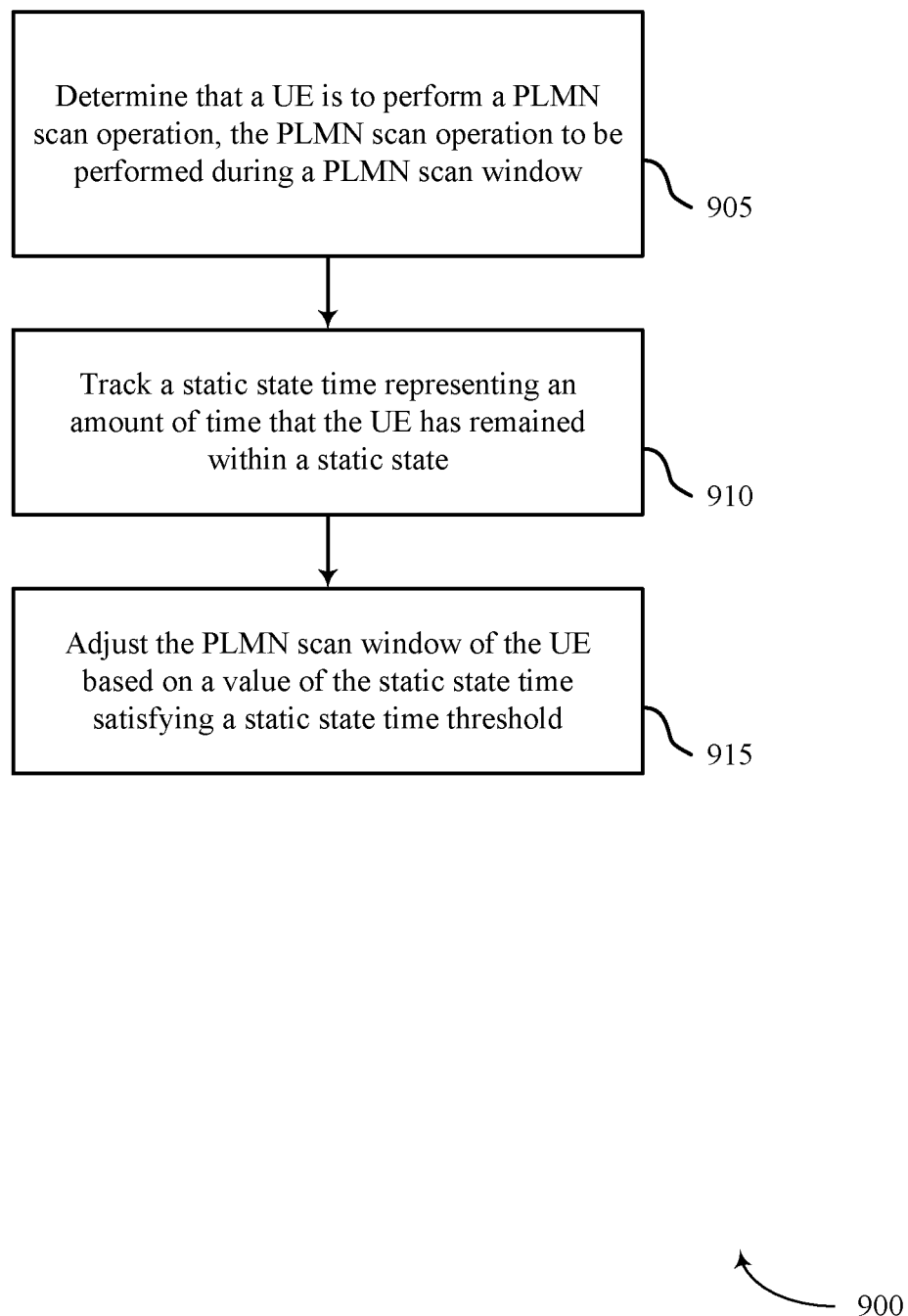
FIGS. 9 through 11 illustrate methods for PLMN search in static state using sensor inputs in accordance with aspects of the present disclosure.

FIG. 9 shows a flowchart illustrating a method 900 for PLMN search in static state using sensor inputs in accordance with various aspects of the present disclosure. The operations of method 900 may be implemented by a device such as a UE 115, wireless device 500, 600, or 700, or components thereof as described with reference to FIGS. 1, 2, and 4 through 8. For example, the operations of method 900 may be performed by the network search manager as described herein. In some examples, the UE 115 or wireless device 500, 600, or 700 may execute a set of codes to control the functional elements of the device to perform the functions described below. Additionally or alternatively, the UE 115 or wireless device 500, 600, or 700 may perform aspects the functions described below using special-purpose hardware.

At block 905, the UE 115 may determine that a UE is to perform a PLMN scan operation, the PLMN scan operation to be performed during a PLMN scan window as described above with reference to FIGS. 2 through 4. In certain examples, the operations of block 905 may be performed by the network scan component as described with reference to FIGS. 6 and 7.

At block 910, the UE 115 may track a static state time representing an amount of time that the UE has remained within a static state as described above with reference to FIGS. 2 through 4. In certain examples, the operations of block 910 may be performed by the static state timer component as described with reference to FIGS. 6 and 7. The UE 115 may keep the static state time in a static state timer.

At block 915, the UE 115 may adjust the PLMN scan window of the UE based on a value of the static state time satisfying a static state time threshold as described above with reference to FIGS. 2 through 4. In certain examples, the operations of block 915 may be performed by the scan window component as described with reference to FIGS. 6 and 7. For example, the UE 115 may adjust the PLMN scan window by extending the sleep time interval or decreasing the active scan time interval relative to conventional time durations.

Figure 10:
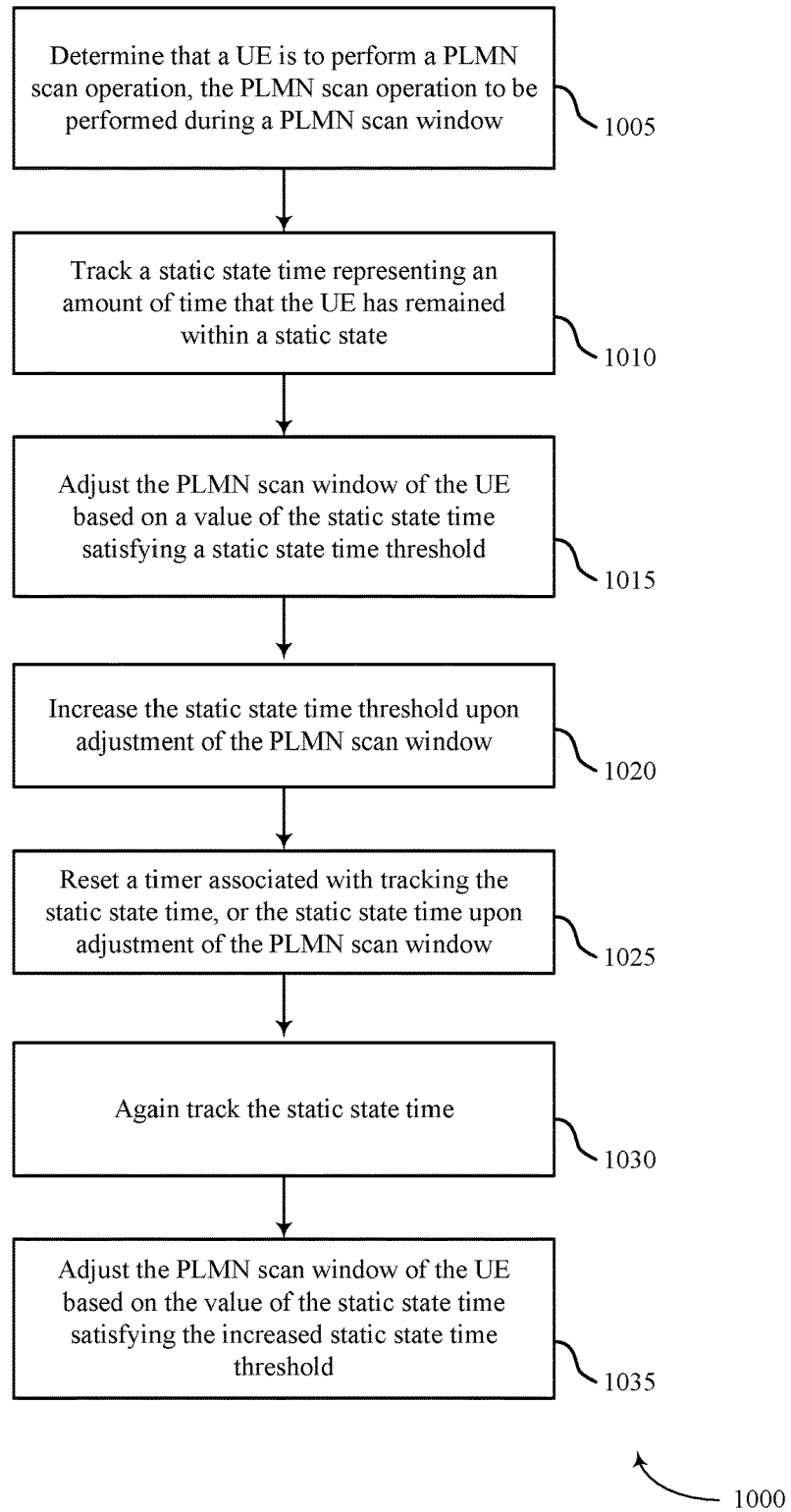

FIG. 10 shows a flowchart illustrating a method 1000 for public land mobile network search in static state using sensor inputs in accordance with various aspects of the present disclosure. The operations of method 1000 may be implemented by a device such as a UE 115, wireless device 500, 600, or 700, or components thereof as described with reference to FIGS. 1, 2, and 4 through 8. For example, the operations of method 1000 may be performed by the network search manager as described herein. In some examples, the UE 115 or wireless device 500, 600, or 700 may execute a set of codes to control the functional elements of the device to perform the functions described below. Additionally or alternatively, the UE 115 or wireless device 500, 600, or 700 may perform aspects the functions described below using special-purpose hardware.

At block 1005, the UE 115 may determine that a UE is to perform a PLMN scan operation, the PLMN scan operation to be performed during a PLMN scan window as described above with reference to FIGS. 2 through 4. In certain examples, the operations of block 1005 may be performed by the network scan component as described with reference to FIGS. 6 and 7.

At block 1010, the UE 115 may track a static state time representing an amount of time that the UE has remained within a static state as described above with reference to FIGS. 2 through 4. In certain examples, the operations of block 1010 may be performed by the static state timer component as described with reference to FIGS. 6 and 7. The UE 115 may keep the static state time in a static state timer.

At block 1015, the UE 115 may adjust the PLMN scan window of the UE based on a value of the static state time satisfying a static state time threshold as described above with reference to FIGS. 2 through 4. In certain examples, the operations of block 1015 may be performed by the scan window component as described with reference to FIGS. 6 and 7. For example, the UE 115 may adjust the PLMN scan window by extending the sleep time interval or decreasing the active scan time interval relative to conventional time durations.

At block 1020, the UE 115 may adjust (e.g., increase) the static state time threshold upon adjustment of the PLMN scan window as described above with reference to FIGS. 2 through 4. In certain examples, the operations of block 1020 may be performed by the scan window component as described with reference to FIGS. 6 and 7. The static state time threshold may be adjusted by a sum based in part on the previous value of the static state time threshold and the adjusted PLMN scan window from block 1015.

At block 1025, the UE 115 may reset a timer associated with tracking the static state time, or the static state time upon adjustment of the PLMN scan window as described above with reference to FIGS. 2 through 4. In certain examples, the operations of block 1025 may be performed by the static state timer component as described with reference to FIGS. 6 and 7. After the PLMN scan window is adjusted, UE 115 may reset this timer to zero.

At block 1030, the UE 115 may again track the static state time as described above with reference to FIGS. 2 through 4. In certain examples, the operations of block 1030 may be performed by the static state timer component as described with reference to FIGS. 6 and 7. The static state time begins at zero as set by block 1025.

At block 1035, the UE 115 may adjust the PLMN scan window of the UE based on the value of the static state time satisfying the adjusted (e.g., increased) static state time threshold as described above with reference to FIGS. 2 through 4. In certain examples, the operations of block 1035 may be performed by the scan window component as described with reference to FIGS. 6 and 7. For example, the UE 115 may adjust the PLMN scan window by extending the sleep time interval or decreasing the active scan time interval relative to conventional time durations. In subsequent iterations, the UE 115 may extend the sleep time interval or decrease the active scan time interval in greater amounts.

Figure 11:
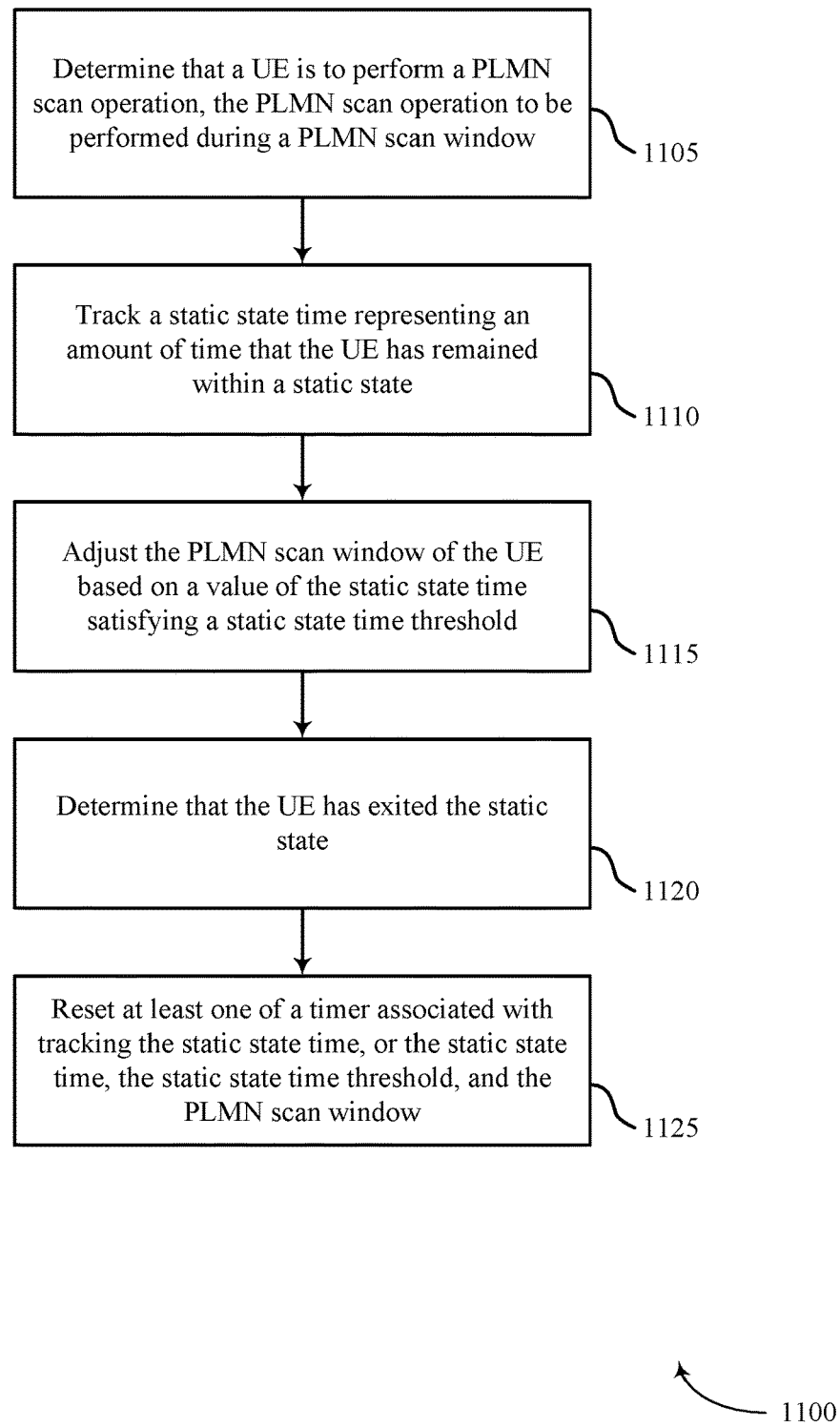

FIG. 11 shows a flowchart illustrating a method 1100 for public land mobile network search in static state using sensor inputs in accordance with various aspects of the present disclosure. The operations of method 1100 may be implemented by a device such as a UE 115, wireless device 500, 600, or 700, or components thereof as described with reference to FIGS. 1, 2, and 4 through 8. For example, the operations of method 1100 may be performed by the network search manager as described herein. In some examples, the UE 115 or wireless device 500, 600, or 700 may execute a set of codes to control the functional elements of the device to perform the functions described below. Additionally or alternatively, the UE 115 or wireless device 500, 600, or 700 may perform aspects the functions described below using special-purpose hardware.

At block 1105, the UE 115 may determine that a UE is to perform a PLMN scan operation, the PLMN scan operation to be performed during a PLMN scan window as described above with reference to FIGS. 2 through 4. In certain examples, the operations of block 1105 may be performed by the network scan component as described with reference to FIGS. 6 and 7.

At block 1110, the UE 115 may track a static state time representing an amount of time that the UE has remained within a static state as described above with reference to FIGS. 2 through 4. In certain examples, the operations of block 1110 may be performed by the static state timer component as described with reference to FIGS. 6 and 7. The UE 115 may keep the static state time in a static state timer.

At block 1115, the UE 115 may adjust the PLMN scan window of the UE based on a value of the static state time meeting or exceeding a static state time threshold as described above with reference to FIGS. 2 through 4. In certain examples, the operations of block 1115 may be performed by the scan window component as described with reference to FIGS. 6 and 7. For example, the UE 115 may adjust the PLMN scan window by extending the sleep time interval or decreasing the active scan time interval relative to conventional time durations.

At block 1120, the UE 115 may determine that the UE has exited the static state as described above with reference to FIGS. 2 through 4. In certain examples, the operations of block 1120 may be performed by the state determining component as described with reference to FIGS. 6 and 7. This static state determination may be performed by a motion-detecting sensor. The motion-detecting sensor may be one or more of the following: an accelerometer, a gyroscope, a global positioning sensor (GPS), a gravity sensor, a rotational vector sensor, a positional orientation sensor, a magnetometer, a UE compass, or a pedometer.

At block 1125, the UE 115 may reset the timer, the static state time threshold, and the PLMN scan window as described above with reference to FIGS. 2 through 4. In certain examples, the operations of block 1125 may be performed by the scan window component as described with reference to FIGS. 6 and 7. The timer may be reset to zero, and the static state time threshold and the PLMN scan window may be reset to conventional durations if they were adjusted previously.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for public land mobile network search in static state using sensor inputs.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for public land mobile network search in static state using sensor inputs. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a user equipment (UE) comprising:
    determining that the UE is to perform a public land mobile network (PLMN) scan operation, the PLMN scan operation to be performed during a PLMN scan window;
    tracking a static state time representing an amount of time that the UE has remained within a static state;
    adjusting the PLMN scan window of the UE based at least in part on a value of the static state time satisfying a static state time threshold;
    updating the static state time threshold based at least in part on the value of the static state time satisfying the static state time threshold, wherein an updated static state time threshold is based on at least one of a previous value of the static state time threshold and the adjusted PLMN scan window;
    resetting a timer associated with the static state time upon adjustment of the PLMN scan window; and
    performing the PLMN scan operation utilizing the adjusted PLMN scan window.

2. The method of claim 1, wherein adjusting the PLMN scan window comprises:
    extending a sleep interval of the PLMN scan window.

3. The method of claim 1, wherein updating the static state time threshold comprises:
    increasing the static state time threshold upon adjustment of the PLMN scan window.

4. The method of claim 3, further comprising:
    prior to performing the PLMN scan operation:
    again tracking the static state time; and
    adjusting the PLMN scan window of the UE based at least in part on the value of the static state time satisfying the updated static state time threshold.

5. The method of claim 1, wherein adjusting the PLMN scan window comprises:
    adjusting a parameter associated with the PLMN scan window by a predetermined amount.

6. The method of claim 5, further comprising:
    determining that the UE is in a low battery state; and
    adjusting the predetermined amount based at least in part on the determination that the UE is in the low battery state.

7. The method of claim 1, further comprising:
    determining that the UE has exited the static state; and
    resetting at least one of the timer associated with the static state time, the static state time, the static state time threshold, or the PLMN scan window.

8. The method of claim 1, wherein adjusting the PLMN scan window comprises:
    decreasing an active scan time interval of the PLMN scan window.

9. The method of claim 1, further comprising:
    identifying, via a motion-detecting sensor, that the UE has remained within the static state, wherein the motion-detecting sensor comprises at least one of an accelerometer, a gyroscope, a global positioning sensor (GPS), a gravity sensor, a rotational vector sensor, a positional orientation sensor, a magnetometer, a UE compass, or a pedometer.

10. The method of claim 1, wherein the updated static state time threshold is based on a sum of the previous value of the static state time threshold and the adjusted PLMN scan window.

11. A user equipment (UE) for wireless communication comprising:
    means for determining that the UE is to perform a public land mobile network (PLMN) scan operation, the PLMN scan operation to be performed during a PLMN scan window;
    means for tracking a static state time representing an amount of time that the UE has remained within a static state;
    means for adjusting the PLMN scan window of the UE based at least in part on a value of the static state time satisfying a static state time threshold;
    means for updating the static state time threshold based at least in part on the value of the static state time satisfying the static state time threshold, wherein an updated static state time threshold is based on at least one of a previous value of the static state time threshold and the adjusted PLMN scan window;
    means for resetting a timer associated with the static state time upon adjustment of the PLMN scan window; and
    means for performing the PLMN scan operation utilizing the adjusted PLMN scan window.

12. A user equipment (UE) for wireless communication, comprising:
    a processor;
    memory in electronic communication with the processor; and
    one or more instructions stored in the memory and operable, when executed by the processor, to cause the apparatus to:
    determine that the UE is to perform a public land mobile network (PLMN) scan operation, the PLMN scan operation to be performed during a PLMN scan window;
    track a static state time representing an amount of time that the UE has remained within a static state;
    adjust the PLMN scan window of the UE based at least in part on a value of the static state time satisfying a static state time threshold;
    update the static state time threshold based at least in part on the value of the static state time satisfying the static state time threshold, wherein an updated static state time threshold is based on at least one of a previous value of the static state time threshold and the adjusted PLMN scan window;
    reset a timer associated with the static state time upon adjustment of the PLMN scan window; and
    perform the PLMN scan operation utilizing the adjusted PLMN scan window.

13. The UE of claim 12, wherein the one or more instructions operable to cause the apparatus to adjust the PLMN scan window comprise instructions operable to cause the apparatus to:
    extend a sleep interval of the PLMN scan window.

14. The UE of claim 12, wherein the one or more instructions operable to cause the apparatus to update the static state time threshold comprise instructions operable to cause the apparatus to:
    increase the static state time threshold upon adjustment of the PLMN scan window.

15. The UE of claim 14, wherein the one or more instructions are operable to cause the apparatus to:
    prior to performing the PLMN scan operation:

again track the static state time; and
adjust the PLMN scan window of the UE based at least in part on the value of the static state time satisfying the updated static state time threshold.

16. The UE of claim 12, wherein the one or more instructions operable to cause the apparatus to adjust the PLMN scan window comprise instructions operable to cause the apparatus to:
adjust a parameter associated with the PLMN scan window by a predetermined amount.

17. The UE of claim 16, wherein the one or more instructions are operable to cause the apparatus to:
determine that the UE is in a low battery state; and
adjust the predetermined amount based at least in part on the determination that the UE is in the low battery state.

18. The UE of claim 12, wherein the one or more instructions are operable to cause the apparatus to:
determine that the UE has exited the static state; and
reset at least one of the timer associated with the static state time, the static state time, the static state time threshold, or the PLMN scan window.

19. The UE of claim 12, wherein the one or more instructions operable to cause the apparatus to adjust the PLMN scan window comprise instructions operable to cause the apparatus to:
decrease an active scan time interval of the PLMN scan window.

20. The UE of claim 12, wherein the one or more instructions are operable to cause the apparatus to:
identify, via a motion-detecting sensor, that the UE has remained within the static state, wherein the motion-detecting sensor comprises at least one of an accelerometer, a gyroscope, a global positioning sensor (GPS), a gravity sensor, a rotational vector sensor, a positional orientation sensor, a magnetometer, a UE compass, or a pedometer.

21. The UE of claim 12, wherein the updated static state time threshold is based on a sum of the previous value of the static state time threshold and the adjusted PLMN scan window.

22. A non-transitory computer-readable medium storing code for wireless communication, the code comprising one or more instructions executable to:
determine that a user equipment (UE) is to perform a public land mobile network (PLMN) scan operation, the PLMN scan operation to be performed during a PLMN scan window;
track a static state time representing an amount of time that the UE has remained within a static state;
adjust the PLMN scan window of the UE based at least in part on a value of the static state time satisfying a static state time threshold;
update the static state time threshold based at least in part on the value of the static state time satisfying the static state time threshold, wherein an updated static state time threshold is based on at least one of a previous value of the static state time threshold and the adjusted PLMN scan window;
reset a timer associated with the static state time upon adjustment of the PLMN scan window; and
perform the PLMN scan operation utilizing the adjusted PLMN scan window.

23. The non-transitory computer-readable medium of claim 22, wherein the one or more instructions executable to adjust the PLMN scan window comprise instructions executable to:
extend a sleep interval of the PLMN scan window.

24. The non-transitory computer-readable medium of claim 22, wherein the one or more instructions executable to update the static state time threshold comprise instructions executable to:
increase the static state time threshold upon adjustment of the PLMN scan window.

25. The non-transitory computer-readable medium of claim 24, wherein the one or more instructions are executable to:
prior to performing the PLMN scan operation:
again track the static state time; and
adjust the PLMN scan window of the UE based at least in part on the value of the static state time satisfying the updated static state time threshold.

26. The non-transitory computer-readable medium of claim 22, wherein the one or more instructions executable to adjust the PLMN scan window comprise instructions executable to:
adjust a parameter associated with the PLMN scan window by a predetermined amount.

27. The non-transitory computer-readable medium of claim 26, wherein the one or more instructions are executable to:
determine that the UE is in a low battery state; and
adjust the predetermined amount based at least in part on the determination that the UE is in the low battery state.

28. The non-transitory computer-readable medium of claim 22, wherein the one or more instructions are executable to:
determine that the UE has exited the static state; and
reset at least one of the timer associated with the static state time, the static state time, the static state time threshold, or the PLMN scan window.

29. The non-transitory computer-readable medium of claim 22, wherein the one or more instructions executable to adjust the PLMN scan window comprise instructions executable to:
decrease an active scan time interval of the PLMN scan window.

30. The non-transitory computer-readable medium of claim 22, wherein the one or more instructions are executable to:
identify, via a motion-detecting sensor, that the UE has remained within the static state.

* * * * *